(12) United States Patent
Von Fieandt et al.

(10) Patent No.: US 12,553,127 B2
(45) Date of Patent: *Feb. 17, 2026

(54) CUTTING TOOL

(71) Applicant: AB SANDVIK COROMANT, Sandviken (SE)

(72) Inventors: Linus Von Fieandt, Sandviken (SE); Katalin Boor, Sandviken (SE)

(73) Assignee: AB Sandvik Coromant, Sandviken (SE)

( * ) Notice: Subject to any disclaimer, the term of this patent is extended or adjusted under 35 U.S.C. 154(b) by 183 days.

This patent is subject to a terminal disclaimer.

(21) Appl. No.: 18/559,075

(22) PCT Filed: May 6, 2022

(86) PCT No.: PCT/EP2022/062299
§ 371 (c)(1),
(2) Date: Nov. 6, 2023

(87) PCT Pub. No.: WO2022/234094
PCT Pub. Date: Nov. 10, 2022

(65) Prior Publication Data
US 2024/0229232 A1    Jul. 11, 2024

(30) Foreign Application Priority Data
May 7, 2021    (EP) .................................... 21172625

(51) Int. Cl.
*C23C 16/36* (2006.01)
*C22C 29/08* (2006.01)

(52) U.S. Cl.
CPC .............. *C23C 16/36* (2013.01); *C22C 29/08* (2013.01)

(58) Field of Classification Search
None
See application file for complete search history.

(56) References Cited

U.S. PATENT DOCUMENTS

2003/0082296 A1    5/2003 Elers et al.
2003/0126945 A1*   7/2003 Liu ........................ C23C 16/36
                                                             419/57

FOREIGN PATENT DOCUMENTS

EP        3366796 A1      8/2018
JP     2009125902 A   *   6/2009
WO     2018234296 A1     12/2018

OTHER PUBLICATIONS

Hulkko et al."CVD system and control program for WF6 chemistry", Licentiate thesis, Monograph, Uppsala University, 2019, Licentiate thesis, Monograph, Uppsala University, 2019.
Gogova et al. "CVD-WC and WC"xN'y diffusion barrier coatings on WE/Co metalloceramics", Materials Letters, Elsevier, Amsterdam, NL. vol. 35, Jun. 1, 1998, pp. 351-356.

(Continued)

*Primary Examiner* — Seth Dumbris
(74) *Attorney, Agent, or Firm* — Corinne R. Gorski

(57) ABSTRACT

A cutting tool includes a substrate at least partially coated with a 1-25 µm coating. The substrate is of cemented carbide or cermet and the coating includes one or more layers, wherein at least one layer is a $W(C_xN_{1-x})_y$ layer, and wherein $0.6 \leq x \leq 0.8$ and $1.1 \leq y \leq 1.8$ and with a layer thickness of 1-20 µm.

14 Claims, 3 Drawing Sheets

(56) References Cited

OTHER PUBLICATIONS

Kim et al: "Atomic-layer-deposited WNxCy thin films as diffusion barrier for copper metallization", Applied Physics Letters, A I P Publishing LLC, US. vol. 82, No. 25, Jun. 23, 2003, pp. 4486-4488.
Su et al.: "Effects of bias voltage and annealing on the structure and mechanical properties of WC"0". "7"5N"0". "2"5 thin films", Journal of Alloys and Compounds, Elsevier Sequoia, Lausanne, CH, vol. 486, No. 1-2, Nov. 3, 2009, pp. 357-364.

\* cited by examiner

CUTTING TOOL

RELATED APPLICATION DATA

This application is a § 371 National Stage Application of PCT International Application No. PCT/EP2022/062299 filed May 6, 2022 with priority to EP 21172625.2 filed May 7, 2021.

TECHNICAL FIELD

The present invention relates to a coated cutting tool. The cutting tool is CVD coated and the substrate is a cemented carbide or cermet and the CVD coating comprises a layer of $W(C_xN_{1-x})_y$.

BACKGROUND

In the technical area of cutting tools for metal machining, the usage of CVD coatings is a well-known method to enhance the wear resistance of the tool. CVD coatings that are commonly used are coatings such as TiN, TiC, TiCN and $Al_2O_3$.

It is an object of the present invention to provide a cutting tool with increased lifetime in metal cutting. It is also an object of the present invention to provide a cutting tool with high resistance to flank wear and chipping during metal cutting in steel.

DESCRIPTION OF THE INVENTION

The present invention relates to a cutting tool comprising a substrate at least partially coated with a 1-25 μm coating, said substrate is of cemented carbide or cermet, said coating comprise one or more layers, wherein at least one layer is a $W(C_xN_{1-x})_y$ layer, wherein $0.6 \leq x \leq 0.8$ and $1.1 \leq y \leq 1.8$, preferably $0.67 \leq x \leq 0.72$ and $1.17 \leq y \leq 1.76$, with a thickness of 1-20 μm.

Cemented carbide materials are useful in high demanding applications due to their high hardness and high wear resistance in combination with a high toughness. Cemented carbides are produced by powder metallurgical methods, wherein the starting powders are mixed, milled, formed into a green body, pre-sintered and sintered.

Cemented carbide materials generally consist of hard constituents of WC and optional carbides and/or nitrides such as TiC, NbC, TiN in a metallic binder of for example Co or Co in combination with Ni and Fe. The cemented carbide composition, and especially the metallic binder composition, can be analyzed by chemical analysis.

It was surprisingly found that a $W(C_xN_{1-x})_y$ layer with $0.6 \leq x \leq 0.8$ and $1.1 \leq y \leq 1.8$ is high performing as a wear layer on cutting tools for metal cutting. The high amount of C and N in the $W(C_xN_{1-x})_y$ layer of the present invention is believed to contribute to a stable and wear resistant layer also when the coating is exposed to metal cutting applications which usually implies high pressure and high temperature.

In one embodiment of the present invention the $W(C_xN_{1-x})_y$ layer is of hexagonal phase. This is advantageous since the thermal expansion coefficient of hexagonal W(C,N) is similar to the one of WC. This might prevent the formation of thermal cracks in the production of the coated cutting tool and it might also have an influence on the tool life since cutting tools are usually exposed to thermal cycles during usage in cutting such as in intermittent cutting. By hexagonal phase is herein meant 5-WC hexagonal phase.

In one embodiment of the present invention the $W(C_xN_{1-x})_y$ layer is columnar. Thereby the coating comprises columnar grains. Preferably the coating consists of columnar grains. By columnar is herein meant an aspect ratio of grain length to grain width of higher than one. The grain length is in the layer extended in the growth direction of the layer (i.e. parallel to the surface normal of the substrate), while the grain width is along the perpendicular direction to the layer growth direction.

In one embodiment of the present invention the $W(C_xN_{1-x})_y$ layer exhibits a texture coefficient TC(hkl), as measured by X-ray diffraction using Cu Kα radiation and θ-2θ scan, defined according to Harris formula $$TC(hkl) = \frac{I(hkl)}{I_0(hkl)}\left[\frac{1}{n}\sum_{n=1}^{n}\frac{I(hkl)}{I_0(hkl)}\right]^{-1}$$

where I(hkl) is the measured intensity (integrated area) of the (hkl) reflection, $I_0$(hkl) is the standard intensity calculated based on Z. Anorg. Allg. Chem. (1926) 156, 27-36, n is the number of reflections used in the calculation, and where the (hkl) reflections used are (0 0 1), (1 0 0), (1 0 1), (1 1 0), (1 1 1), (1 0 2), (2 0 1), (1 1 2), (2 1 0), (2 1 1) and (1 0 3), wherein TC(100)≥2.5, TC(110)≥2.5 and TC(210)≥2.5.

In one embodiment of the present invention the $W(C_xN_{1-x})_y$ layer exhibits texture coefficients of TC(100)≥3, TC(110)≥3 and TC(210)≥3.

In one embodiment of the present invention said $W(C_xN_{1-x})_y$ layer exhibits a texture coefficient TC(hkl), as measured by X-ray diffraction using Cu Kα radiation and θ-2θ scan, defined according to Harris formula $$TC(hkl) = \frac{I(hkl)}{I_0(hkl)}\left[\frac{1}{n}\sum_{n=1}^{n}\frac{I(hkl)}{I_0(hkl)}\right]^{-1}$$

where I(hkl) is the measured intensity (integrated area) of the (hkl) reflection, $I_0$(hkl) is the standard intensity calculated based on Z. Anorg. Allg. Chem. (1926) 156, 27-36, n is the number of reflections used in the calculation, and where the (hkl) reflections used are (0 0 1), (1 0 0), (1 0 1), (1 1 0), (1 1 1), (1 0 2), (2 0 1), (1 1 2), (2 1 0), (2 1 1) and (1 0 3), wherein TC(100)≥6, preferably ≥7.

In one embodiment of the present invention the $W(C_xN_{1-x})_y$ layer is adjacent to the substrate.

In one embodiment of the present invention the $W(C_xN_{1-x})_y$ layer is the outermost layer of the coating.

In one embodiment of the present invention the metallic binder content in the cemented carbide is 3-20 wt %, preferably 5-15 wt %, most preferably 5-10 wt %.

In one embodiment of the present invention the coating further comprises one or more layers selected from TiN, TiCN, TiCNO, TiCO, AlTiN, ZrCN, $TiB_2$, α-$Al_2O_3$, κ-$Al_2O_3$, and multilayers comprising α-$Al_2O_3$ and/or κ-$Al_2O_3$ in any combination.

In one embodiment of the present invention a layer of $Al_2O_3$ is located between the outermost surface of the cutting tool and said $W(C_xN_{1-x})_y$ layer. In one embodiment said $Al_2O_3$ layer is an α-$Al_2O_3$ layer.

In one embodiment of the present invention the coating comprises the following layers in order from the substrate $W(C_xN_{1-x})_y$, TiN, TiCN, TiCNO, α-$Al_2O_3$.

In one embodiment of the present invention the $W(C_xN_{1-x})_y$ layer is a CVD layer.

Still other objects and features of the present invention will become apparent from the following definitions and examples considered in conjunction with the accompanying drawings.

Methods

Composition of $W(C_xN_{1-x})_y$ Layer

The elemental compositions of the $W(C_xN_{1-x})_y$ layers were analyzed by ToF-ERDA (time-of-flight elastic recoil detection analysis) utilizing a 36 MeV $^{127}I^{8+}$ beam with an incident angle of 67.5° with respect to the surface normal and a recoil detection angle of 45°. The gas ionization chamber detector detects the number and energy of both the scattered $^{127}I^{8+}$ ions, but more importantly also the recoil atoms from the sample. This analysis was combined with a time-of-flight analyzer, which together with the energy detection enabled the calculation of the atomic masses. Thereby the elemental depth profile of the coating was obtained.

The data analysis was carried out using the Potku softwares. The concentrations were calculated by integrating the depth profile between $250\times10^{15}$ and $2000\times10^{15}$ atoms/cm² from the sample surface, approximately between 30-200 nm.

Morphology and Cross Section Analysis of $W(C_xN_{1-x})_y$ Layer

The top morphology of the $W(C_xN_{1-x})_y$ layer was analyzed in a Zeiss Merlin scanning electron microscope equipped with a field emission gun (FEG). For the imaging an acceleration voltage of 3 kV, a probe current of 200 pA and an in-lens secondary electron detector was used.

The cross section of the $W(C_xN_{1-x})_y$ layer was studied in SEM using a Zeiss Supra 55VP microscope. The acceleration voltage was 3 kV and the probe current was 300 pA.

Phase and Orientation Analysis of $W(C_xN_{1-x})_y$ Layer

In order to investigate the phase composition and the texture or orientation of the $W(C_xN_{1-x})_y$ layer X-ray diffraction was conducted on the flank face of cutting tool inserts using a PANalytical CubiX3 diffractometer equipped with a PIXcel detector. The coated cutting tool inserts were mounted in sample holders to ensure that the flank face of the cutting tool inserts is parallel to the reference surface of the sample holder and also that the flank face was at appropriate height. Cu Kα radiation was used for the measurements, with a voltage of 45 kV and a current of 40 mA. Anti-scatter slit of ½ degree and divergence slit of ¼ degree were used. The diffracted intensity from the coated cutting tool was measured in the range 20° to 140° 2θ, i.e. over an incident angle θ range from 10 to 70°.

Texture coefficients, TC (hkl), for different growth directions of the δ-WC layers were calculated according to Harris formula (1):

$$TC(hkl) = \frac{I(hkl)}{I_0(hkl)}\left[\frac{1}{n}\sum_{n=1}^{n}\frac{I(hkl)}{I_0(hkl)}\right]^{-1} \quad (1)$$

where I(hkl)=measured (integrated area) intensity of the hkl reflection, $I_0$(hkl)=standard intensity according to a calculated diffractogram based on Z. Anorg. A/g. Chem. (1926) 156, 27-36 and n is the number of reflections to be used in the calculation. In this case, for the $W(C_xN_{1-x})_y$ coatings, the hkl reflections of the following plane groups were used: {0 0 1}, {1 0 0}, {1 0 1}, {1 1 0}, {1 1 1}, {1 0 2}, {2 0 1}, {1 1 2}, {2 1 0}, {2 1 1}, {1 0 3}, altogether n=11 reflections.

It is to be noted that peak overlap is a phenomenon that can occur in X-ray diffraction analysis and some reflections of the $W(C_xN_{1-x})_y$ layer may overlap depending on the peak widths. Reflections that may overlap are: 0 0 1 with 1 0 0; 1 1 0 with 0 0 2; 1 1 1 with 2 0 0 and 1 0 2; 2 1 0 with 0 0 3 and 2 0 2; 2 1 1 with 1 0 3. All of these overlaps needed to be considered for the {0 0 1}-textured sample, which had broad peaks due to the small grains. The diffractograms of the other two samples had mostly well separated peaks and some peaks of which the intensity was close to zero. The overlapping peaks were fitted as separate peaks and the reasonability of the fitting results was controlled by the peak intensities relative to peaks of parallel or nearly parallel planes.

The data analysis, including background fitting and profile fitting of the data, was done using the PANalytical's X'Pert HighScore Plus 3.0b software. The Cu $K\alpha_2$ radiation intensity was not stripped prior to the fitting, but instead the Cu $K\alpha_2$ peaks were included in the fitting and in the end only the Cu $K\alpha_1$ peak intensities were used in the texture coefficient calculations. Since coatings in general are finitely thick, the relative intensities of a pair of peaks at different 2θ angles are different than they are for bulk samples, due to the differences in path length through the layer. Therefore, thin film correction normally needs to be applied, whereby the extracted integrated peak area intensities for the profile fitted curve are corrected before calculating the TC values, taking into account also the linear absorption coefficient of the layer. In this particular case, the integrated peak areas were not thin film corrected, since the correction when calculating the TC values for a ≥5 μm film was calculated to be at least 0.95 for all angles. With a similar reasoning, the intensities deriving from of the substrate were ignored, due to the absorption in the overlying $W(C_xN_{1-x})_y$ layers, causing a 20× intensity drop even at the highest θ angle where a peak could be observed.

All these peaks would otherwise overlap with the coating peaks.

BRIEF DESCRIPTION OF DRAWINGS

Embodiments of the invention will be described with reference to the accompanying drawings, wherein.

EXAMPLES

Figure 1:
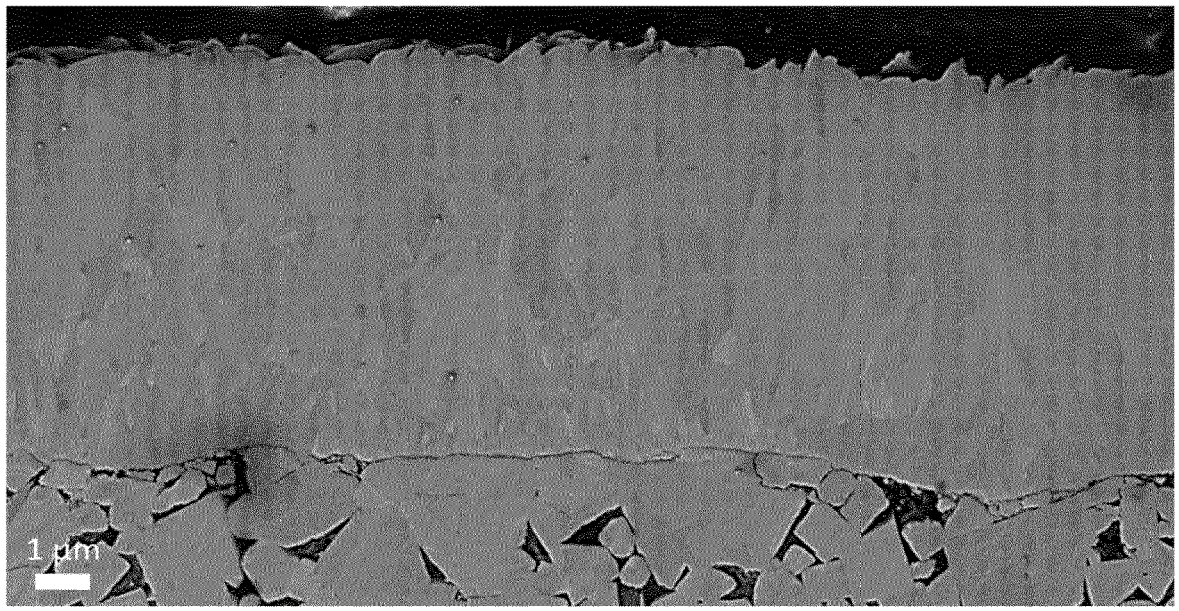
FIG. 1 is a cross-sectional SEM micrograph showing the $W(C_xN_{1-x})_y$ layer of sample A.

Embodiments of the present invention will be disclosed in more detail in connection with the following examples. The examples are to be considered as illustrative and not limiting embodiments. In the following examples coated cutting tools (inserts) were manufactured, analyzed and evaluated in cutting tests.

Substrates

Cemented carbide substrates were manufactured from a powder mixture with a composition of about 7.20 wt % Co, 1.80 wt % Ti, 2.69 wt % Ta, 0.41 wt % Nb, 0.09 wt % N and balance WC. The powder mixture was milled, dried, pressed and sintered at 1450° C. The sintered cemented carbide substrates comprised a Co enriched surface zone from the substrate surface and to a depth of about 23 m into the body being essentially free from cubic carbides as measured in a light optical microscope. The sintered cemented carbide substrates comprised about 7.2 wt % Co. No free graphite or eta phase was visible in a SEM micrograph of a cross section of the cemented carbide substrates. The geometry of the cemented carbide substrates were of ISO-type CNMG120408 for turning.

$W(C_xN_{1-x})_y$ Deposition Prior to the coating depositions every substrate was cleaned in a gentle blasting step to remove the outermost metal from the surfaces. The substrates were also cleaned in ethanol bath for 30 minutes prior to the depositions.

The $W(C_xN_{1-x})_y$ layers were deposited in a hot-wall horizontal tube furnace reactor described in detail in J. Gerdin Hulkko, Muspel and Surtr: *CVD system and control program for $WF_6$ chemistry*, Licentiate thesis, Monograph, Uppsala University, 2019. The main characteristics of the reactor system are described here. The tube is made of a ferritic iron-chromium-aluminum alloy from Kanthal. An inner tube made of isotropic graphite prevents the outer tube from extensive etching and it has an inner diameter of 47 mm. The tube has a 175 mm long cold zone before reaching the furnace. The furnace has a 130 mm unheated zone followed by three separately heated zones of 250 mm, 500 mm, 250 mm and a last unheated zone of 130 mm. The temperature in the heated zones is controlled by Eurotherm 3216 PID controllers and K-type thermocouples are placed outside the reactor tube and inside the furnace at the center of each zone. The inside temperature in the central zone was calibrated with a K-type thermocouple inserted through a 3 mm O-ring sealed port. During the processes the three heated zones were kept at the same temperature.

The precursor flows are controlled by MKS GM50A mass flow controllers for the $WF_6$ (5.5 purity), $H_2$ (5.6 purity) and Ar (6.0 purity) and by a MKS 1152C mass flow controller kept at a temperature of 40° C. for the $CH_3CN$ (>99.9% purity). The $CH_3CN$ evaporator cylinder is kept at 25° C. and the pipes between the cylinder and mass flow controller at 45° C. All other gases are kept in cylinders at room temperature. The gases are transported in 316 stainless steel pipes and at the connections silver plated VCR or copper gaskets are used. The bulk gas ($H_2$ diluted with Ar) enter the reactor tube directly at the front of the reactor. The other two precursors ($WF_6$ with Ar and $CH_3CN$ with Ar) are transported in separate Inconel600 pipes through the first heated zone and enter the reactor tube 25 mm into the central heated zone. The low pressure is maintained by a S20N root pump from Ebara technologies (maximum capacity 100 m³/h, ultimate pressure $3.75 \times 10^{-2}$ Torr). The gas flow is throttled by an O-ring sealed butterfly valve (MKS 153D) and regulated by a PID vacuum control system (MKS 946). For the pressure measurement a 1 Torr full-range temperature stabilized capacitance manometer (MKS 627B) is used. The pressure readout was calibrated by pumping the system to the high vacuum range by a turbomolecular pump.

The deposition zone was between 90-230 mm from the gas mixing point, where coatings of even thickness, the same crystallographic phase and the same dominating texture could be obtained.

The $W(C_xN_{1-x})_y$ of sample A was deposited using 3.7 vol % $WF_6$, 1.2 vol % $CH_3CN$, 25 vol % $H_2$ and balance Ar at 715° C. and at a pressure of 133 Pa. The total gas flow was set to 350 sccm and the deposition rate was about 0.5 μm per hour.

The $W(C_xN_{1-x})_y$ of sample B was deposited using 0.8 vol % $WF_6$, 1.2 vol % $CH_3CN$, 25 vol % $H_2$ and balance Ar at 715° C. and at a pressure of 133 Pa. The total gas flow was set to 350 sccm and the deposition rate was about 1 μm per hour.

The $W(C_xN_{1-x})_y$ of sample C was deposited using 1.8 vol % $WF_6$, 1.2 vol % $CH_3CN$, 5.7 vol % $C_2H_4$, 25 vol % $H_2$ and balance Ar at 715° C. and at a pressure of 133 Pa. The total gas flow was set to 350 sccm and the deposition rate was about 0.5 μm per hour.

$W(C_xN_{1-x})_y$ Layer Analyses

Figure 2:
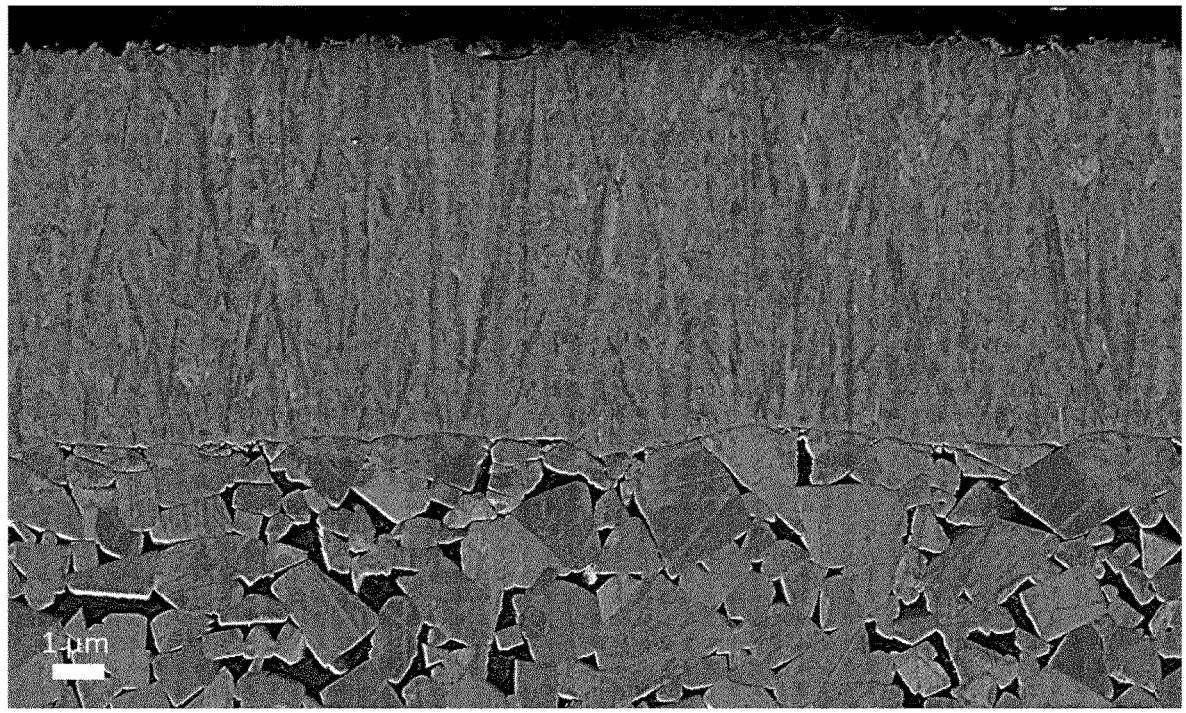
FIG. 2 is a cross-sectional SEM micrograph showing the $W(C_xN_{1-x})_y$ layer of sample B.
Figure 3:
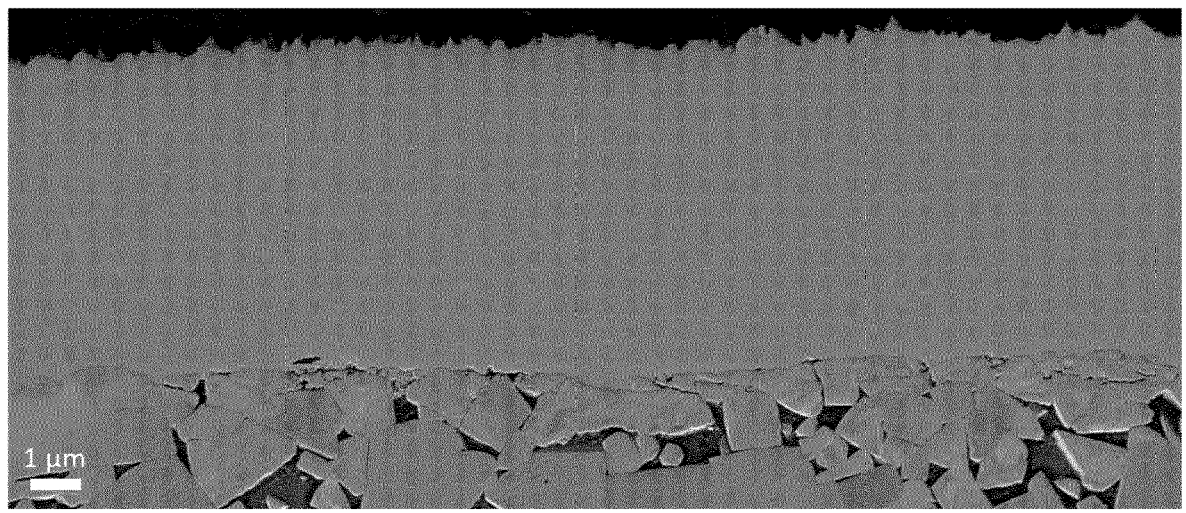
FIG. 3 is a cross-sectional SEM micrograph showing the $W(C_xN_{1-x})_y$ layer of sample C.
Figure 4:
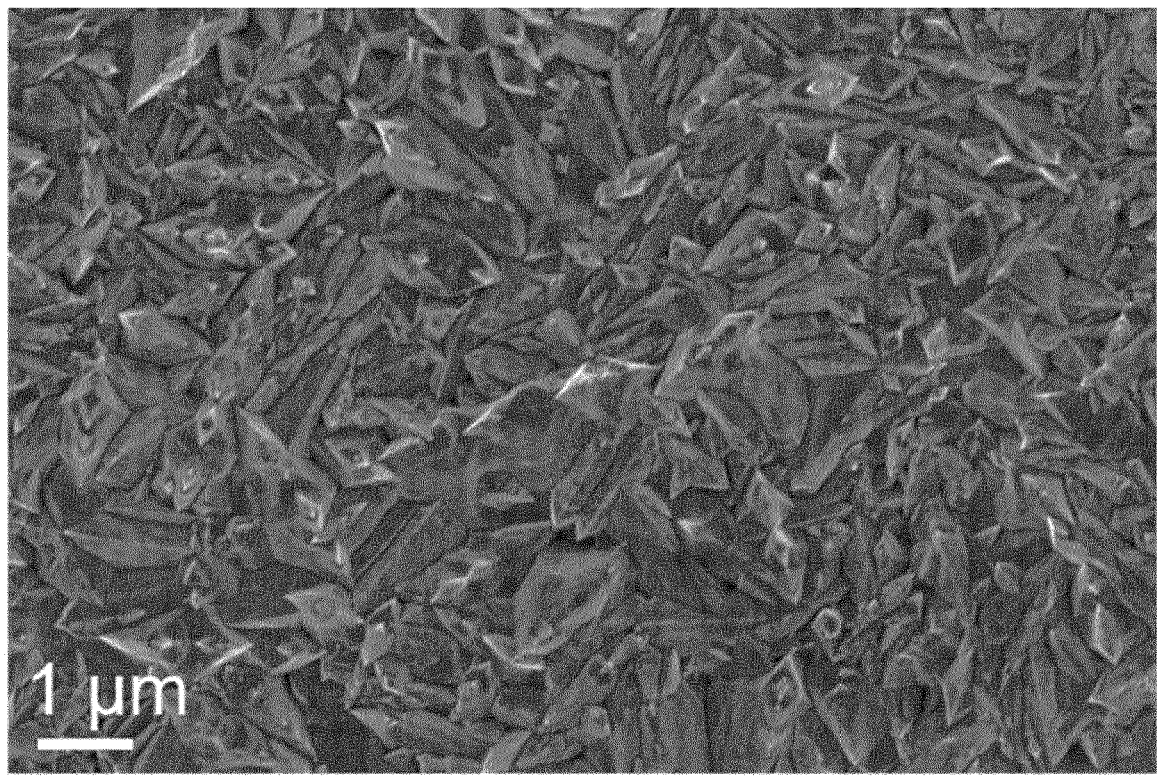
FIG. 4 is a SEM top image of the $W(C_xN_{1-x})_y$ layer of sample A.
Figure 5:
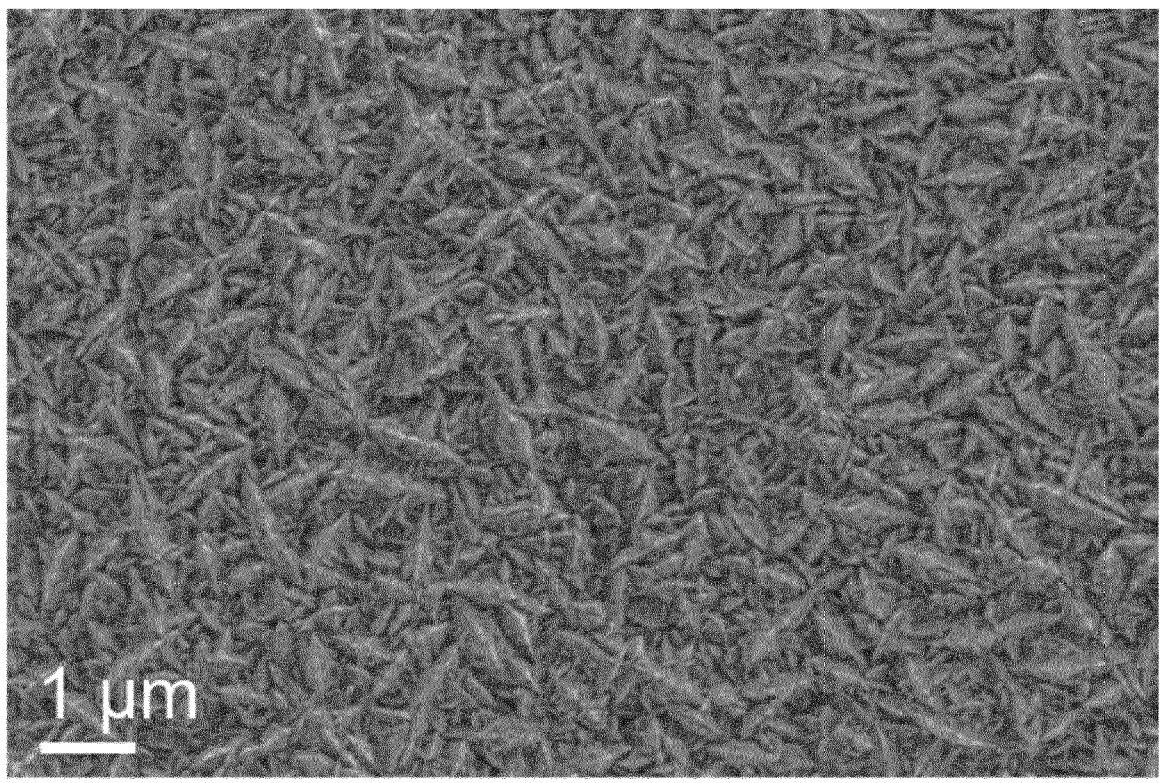
FIG. 5 is a SEM top image of the $W(C_xN_{1-x})_y$ layer of sample B.
Figure 6:
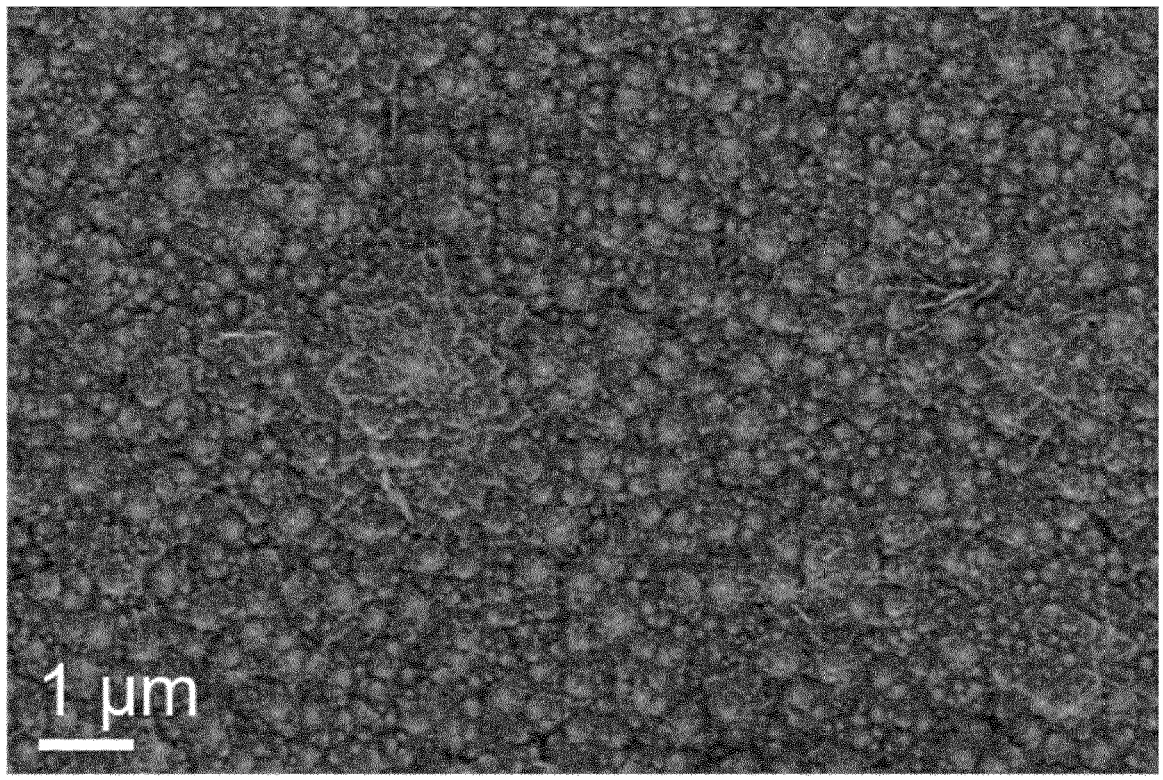
FIG. 6 is a SEM top image of the $W(C_xN_{1-x})_y$ layer of sample C.

The samples A, B and C were studied in SEM, both cross sections and top views, see FIGS. 1-6. The samples A and B have a ridge-like top morphology and that the $W(C_xN_{1-x})_y$ layer of sample A has a larger grain size than the $W(C_xN_{1-x})_y$ layer of sample $W(C_xN_{1-x})_y$ layer of sample B. The Sample C is fine grained, where the fine grains grew on top of each other in a columnar manner with a typically star-like top morphology. The texture coefficients were analyzed by X-ray diffraction. A summary of the samples, with the $W(C_xN_{1-x})_y$ layer thicknesses as measured with SEM, are given in Table 1. All the calculated TC values are presented in Table 2.

TABLE 1

Summary of the samples

| Sample | TC(100) | TC(110) | TC(210) | TC(001) | Layer thickness $W(C_xN_{1-x})_y$ [μm] |
|---|---|---|---|---|---|
| A | 3.31 | 3.91 | 3.45 | 0 | 7.7 |
| B | 7.55 | 0.09 | 0.93 | 0 | 7.7 |
| C | 0.84 | 1.12 | 1.51 | 3.42 | 6.6 |

TABLE 2

Texture coefficients of the $W(C_xN_{1-x})_y$ layers

| Sample | A | B | C |
|---|---|---|---|
| TC(0 0 1) | 0 | 0 | 3.4 |
| TC(1 0 0) | 3.3 | 7.6 | 0.8 |
| TC(1 0 1) | 0 | 0.1 | 0.9 |
| TC(1 1 0) | 3.9 | 0.1 | 1.1 |
| TC(1 1 1) | 0 | 0.5 | 0.4 |
| TC(1 0 2) | 0 | 0.7 | 0.4 |
| TC(2 0 1) | 0.1 | 0.4 | 0.4 |
| TC(1 1 2) | 0 | 0.1 | 0.2 |
| TC(2 1 0) | 3.5 | 0.9 | 1.5 |
| TC(2 1 1) | 0.2 | 0.4 | 0.7 |
| TC(1 0 3) | 0 | 0.2 | 1.2 |

The compositions of the $W(C_xN_{1-x})_y$ layers were determined by ERDA on reference samples and are presented in table 3.

TABLE 3

Composition of the $W(C_xN_{1-x})_y$ layers

| Sample | W [at %] | C [at %] | N [at %] | Chemical formula |
|---|---|---|---|---|
| A | 39.70 | 40.48 | 18.50 | $W(C_{0.69}N_{0.31})_{1.49}$ |
| B | 40.27 | 39.95 | 18.29 | $W(C_{0.69}N_{0.31})_{1.45}$ |
| C | 37.90 | 48.21 | 11.71 | $W(C_{0.80}N_{0.20})_{1.58}$ |

Theta-2theta X-ray diffraction was used to analyse the phase of the $W(C_xN_{1-x})_y$ layer. The diffractogram shows that only the hexagonal phase was present in the coating, no cubic $WC_{1-x}$ or $WN_y$ (0.5≤y≤2) reflections and no reflections of the tungsten-rich $W_2C$ phases (with a hexagonal closed packed W-sublattice and C-atoms in half of the octahedral holes) were identified. The peak positions and standard intensities were calculated based on Z. Anorg. Allg. Chem. (1926) 156, 27-36. The calculation was performed using the P. Villars, K. Cenzual, Pearson's Crystal Data—Crystal Structure Database for Inorganic Compounds, Release 2016/17, ASM International, Materials Park, Ohio, USA. The following standard intensities were then used in the TC calculations: $I_0$(0 0 1)=426, $I_0$(1 0 0)=1000, $I_0$(1 0 1)=958.5, $I_0$(1 1 0)=213.7, $I_0$(1 1 1)=240.9, $I_0$(1 0 2)=218.4, $I_0$(2 0 1)=193.5, $I_0$(1 1 2)=155.5, $I_0$(2 1 0)=131.2, $I_0$(2 1 1)=298.6 and $I_0$(1 0 3)=154.8.

The $W(C_xN_{1-x})_y$ layers were studied in SEM and it was noticed that the $W(C_xN_{1-x})_y$ grains in samples A and B were columnar.

Cutting Tests

The cutting tools were tested in a longitudinal turning operation in a work piece material of SS2310, a high alloyed steel. The cutting speed, Vc, was 90 m/min, the feed, fn, was 0.072 mm/revolution in Cutting test 1 and 0.125 mm/revolution in Cutting test 2, the depth of cut, a, was 2 mm and water miscible cutting fluid was used. The machining was continued until the end of lifetime criterion was reached. One cutting edge per cutting tool was evaluated.

The tool life criterion was set to: for the primary or secondary flank wear >0.35 mm or for the crater area>0.2 $mm^2$. As soon as any of these criteria were met the lifetime of the sample was considered reached. The result of the cutting test is presented in Table 4.

TABLE 4

Cutting test results

| Cutting test | Sample | Lifetime [min] | Criterion setting lifetime |
|---|---|---|---|
| 1 | A | 10 | Secondary flank wear + chipping |
| 1 | B | 8 | Secondary flank wear + chipping |
| 1 | C | 8 | Secondary flank wear + chipping |
| 2 | A | >10 | Secondary flank wear + chipping |
| 2 | B | 10 | Secondary flank wear + chipping |
| 2 | C | 8 | Secondary flank wear + chipping |

As can be seen in Table 4 the sample A shows a prolonged lifetime compared to samples B and C in the first cutting test as a result improved wear resistance on the secondary flank and improved chipping resistance. Furthermore, in cutting test 2, sample A once again shows the longest tool life, as a result of improved wear resistance on the secondary flank and improved chipping resistance.

While the invention has been described in connection with various exemplary embodiments, it is to be understood that the invention is not to be limited to the disclosed exemplary embodiments; on the contrary, it is intended to cover various modifications and equivalent arrangements within the appended claims.

The invention claimed is:

1. A cutting tool comprising a substrate at least partially coated with a 1-25 µm coating, said substrate being of cemented carbide or cermet, said coating having one or more layers, wherein at least one layer is a $W(C_xN_{1-x})_y$ layer, wherein 0.6≤x≤0.8 and 1.1≤y≤1.8, with a thickness of 1-20 µm.

2. The cutting tool according to claim 1, wherein the $W(C_xN_{1-x})_y$ layer is of hexagonal phase.

3. The cutting tool of claim 1, wherein the $W(C_xN_{1-x})_y$ layer is columnar.

4. The cutting of claim 1, wherein said $W(C_xN_{1-x})_y$ layer exhibits a texture coefficient TC(hkl), as measured by X-ray diffraction using Cu Kα radiation and θ-2θ scan, defined according to Harris formula $$TC(hkl) = \frac{I(hkl)}{I_0(hkl)}\left[\frac{1}{n}\sum_{n=1}^{n}\frac{I(hkl)}{I_0(hkl)}\right]^{-1}$$

where I(hkl) is the measured intensity (integrated area) of the (hkl) reflection, $I_0$(hkl) is the standard intensity calculated based on Z. Anorg. Allg. Chem. (1926) 156, 27-36, n is the number of reflections used in the calculation, and where the (hkl) reflections used are (0 0 1), (1 0 0), (1 0 1), (1 1 0), (1 1 1), (1 0 2), (2 0 1), (1 1 2), (2 1 0), (2 1 1) and (1 0 3), wherein TC (100)≥2.5, TC(110)≥2.5 and TC(210) ≥2.5.

5. The cutting tool according to claim 4, wherein TC(100) ≥3, TC(110)≥3 and TC(210)≥3.

6. The cutting tool of claim 1, wherein said $W(C_xN_{1-x})_y$ layer exhibits a texture coefficient TC (hkl), as measured by X-ray diffraction using Cu Kα radiation and θ-2θ scan, defined according to Harris formula $$TC(hkl) = \frac{I(hkl)}{I_0(hkl)}\left[\frac{1}{n}\sum_{n=1}^{n}\frac{I(hkl)}{I_0(hkl)}\right]^{-1}$$

where I(hkl) is the measured intensity (integrated area) of the (hkl) reflection, $I_0$(hkl) is the standard intensity calculated based on Z. Anorg. Allg. Chem. (1926) 156, 27-36, n is the number of reflections used in the calculation, and where the (hkl) reflections used are (0 0 1), (1 0 0), (1 0 1), (1 1 0), (1 1 1), (1 0 2), (2 0 1), (1 1 2), (2 1 0), (2 1 1) and (1 0 3), wherein TC(100)≥6.

7. The cutting tool of claim 1, wherein the $W(C_xN_{1-x})_y$ layer is adjacent to the substrate.

8. The cutting tool of claim 1, wherein the $W(C_xN_{1-x})_y$ layer is an outermost layer of the coating.

9. The cutting tool of claim 1, wherein the substrate is cemented carbide and wherein a metallic binder content in the cemented carbide is 3-20 wt %.

10. The cutting tool of claim 1, wherein the coating further comprises one or more layers selected from TiN, TiCN, TiCNO, TiCO, AlTiN, ZrCN, $TiB_2$, α-$Al_2O_3$, κ-$Al_2O_3$, and multilayers comprising α-$Al_2O_3$ and/or κ-$Al_2O_3$ in any combination.

11. The cutting tool of claim 1, wherein a layer of $Al_2O_3$ is located between an outermost surface of the cutting tool and said $W(C_xN_{1-x})_y$ layer.

12. The cutting tool of claim 11, wherein the $Al_2O_3$ layer is an α-$Al_2O_3$ layer.

13. The cutting tool of claim 1, wherein the coating includes the following layers in order from the substrate $W(C_xN_{1-x})_y$, TiN, TiCN, TiCNO, α-$Al_2O_3$.

14. The cutting tool of claim 1, wherein the $W(C_xN_{1-x})_y$ layer is a CVD layer.

* * * * *